Aug. 27, 1968   N. P. MILLIGAN   3,399,346
PHASE-SENSITIVE DETECTOR APPARATUS USING SETS OF CONSTANT
POWER VARIABLE AVERAGE AMPLITUDE PULSES
Original Filed Dec. 9, 1964   5 Sheets-Sheet 2

INVENTOR.
NEAL P. MILLIGAN
BY
MAHONEY, MILLER & RAMBO
BY
ATTORNEYS

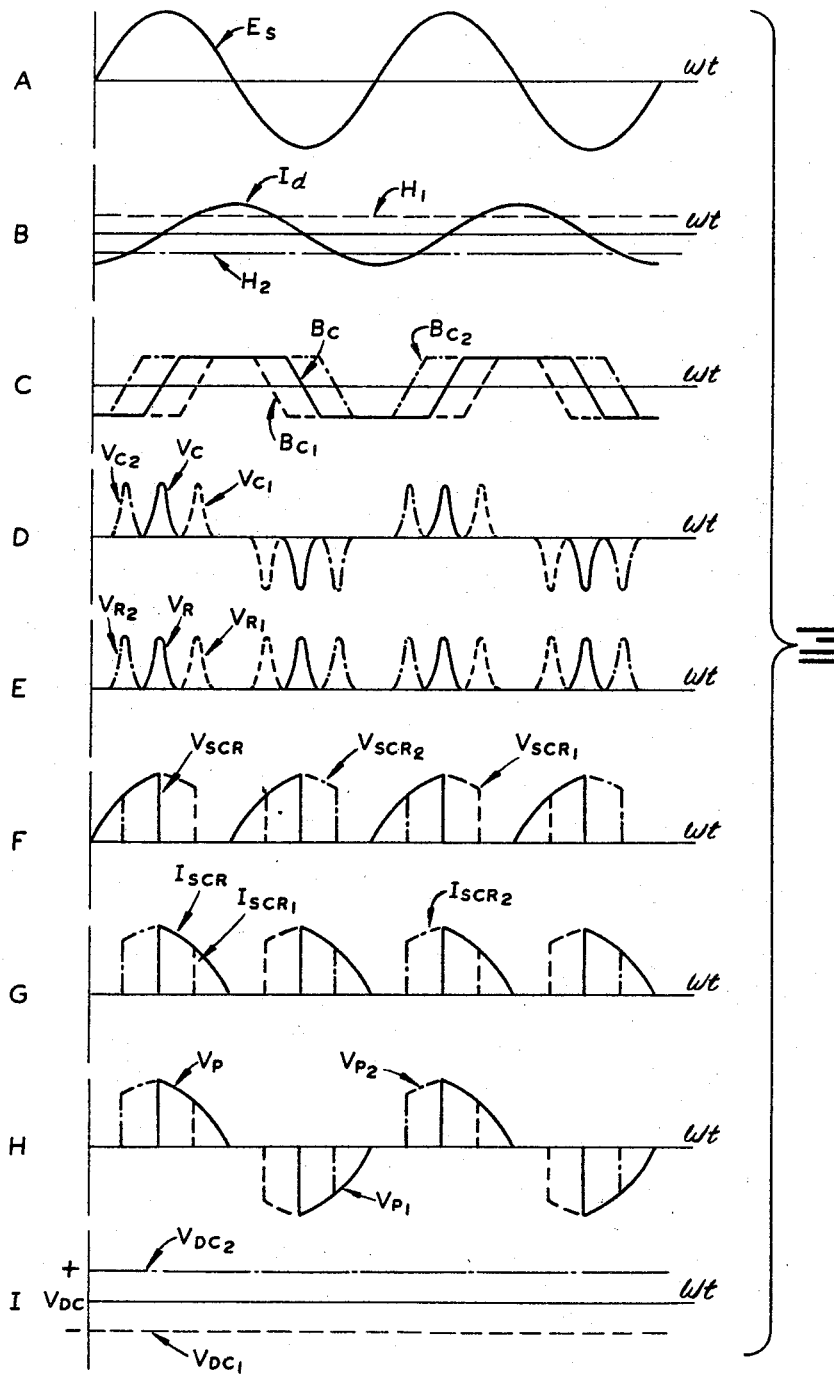

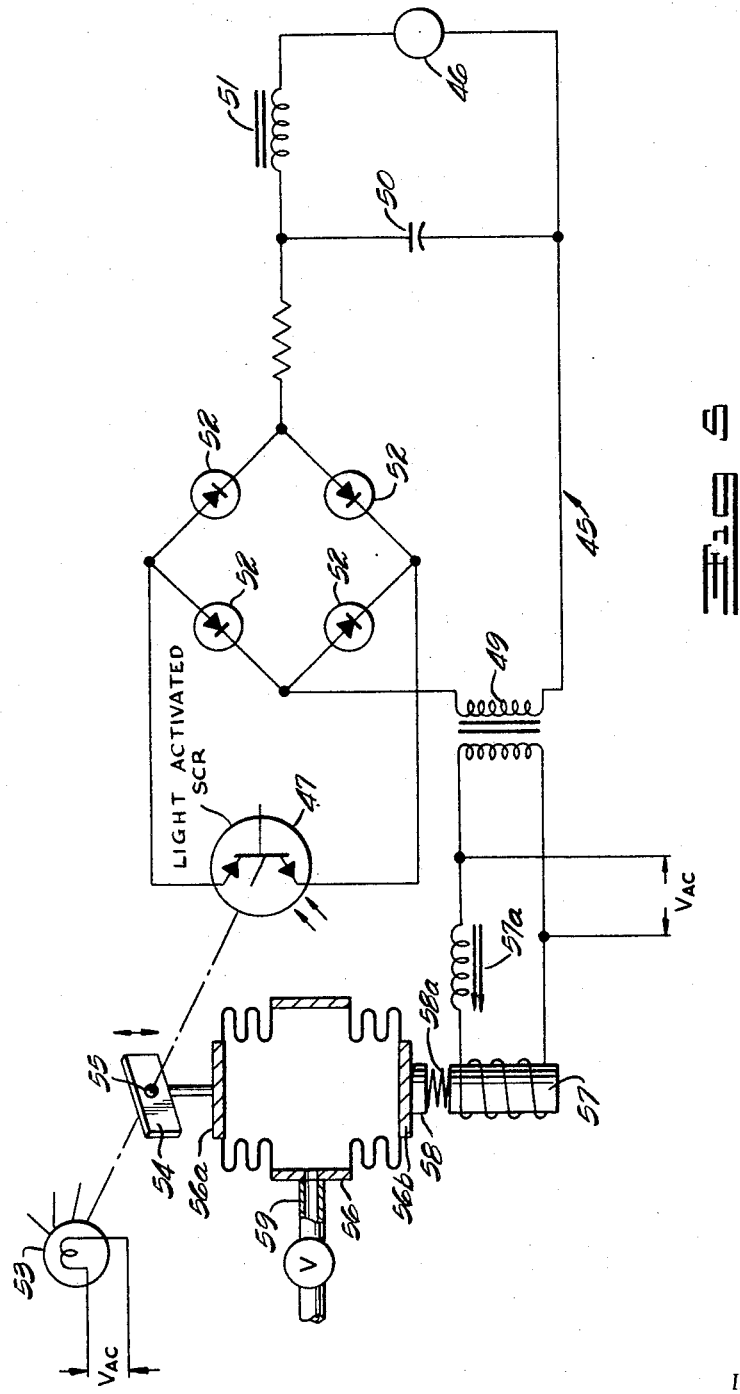

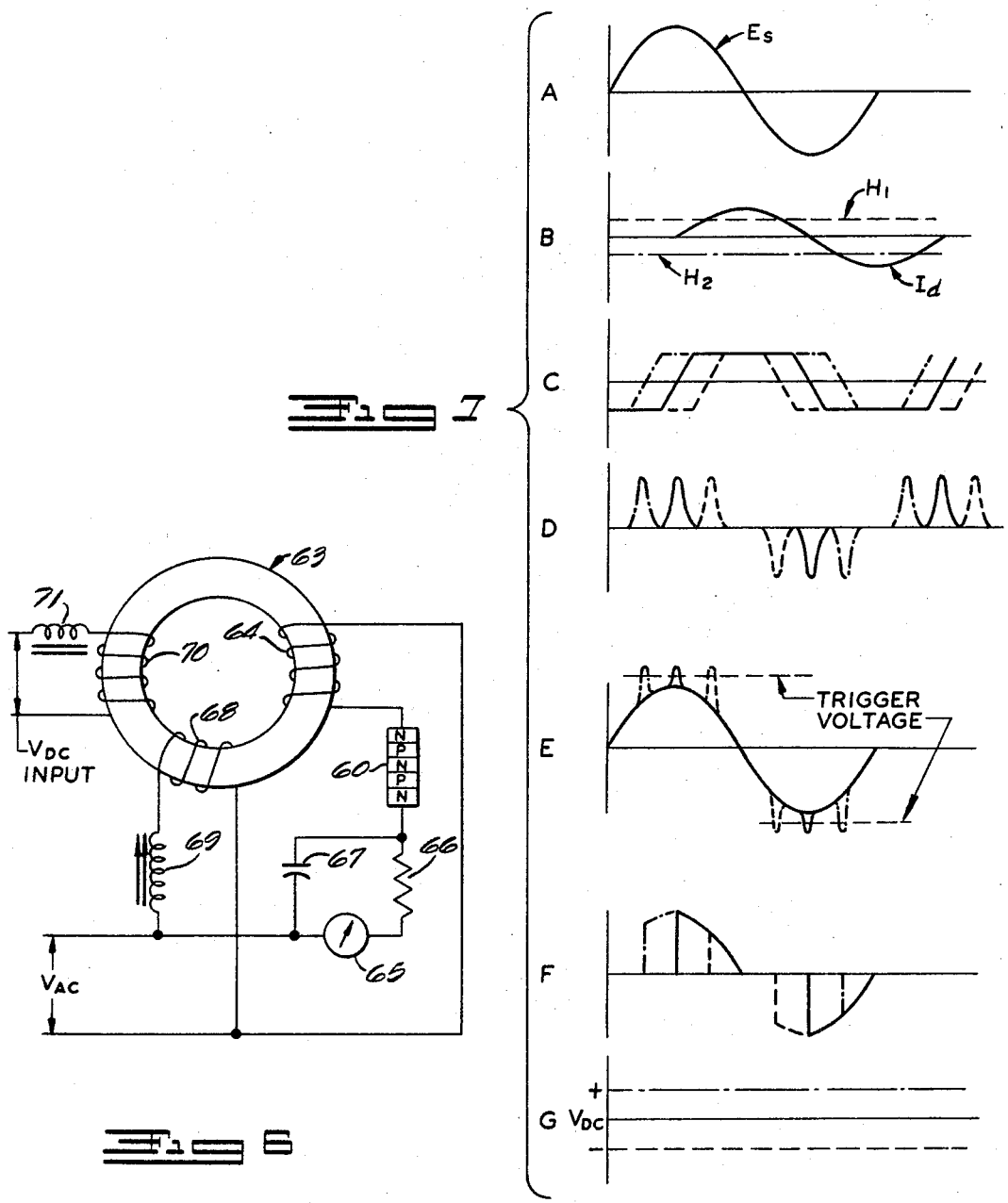

United States Patent Office 3,399,346
Patented Aug. 27, 1968

3,399,346
PHASE-SENSITIVE DETECTOR APPARATUS USING SETS OF CONSTANT POWER VARIABLE AVERAGE AMPLITUDE PULSES
Neal P. Milligan, Dublin, Ohio
(4230 Darbyshire Court, Columbus, Ohio 43221)
Continuation of application Ser. No. 417,076, Dec. 9, 1964. This application Apr. 20, 1967, Ser. No. 632,454
10 Claims. (Cl. 324—87)

This application is a continuation of Ser. No. 417,076, filed Dec. 9, 1964, and now abandoned.

This invention relates, in general, to a phase-sentitive detector apparatus. It relates, more specifically, to a detector apparatus of the type having a normally symmetrical waveform signal which is modified by an input signal through relative phase displacement to produce a nonsymmetrical signal having a detectable, direct-current component which is indicative of the input signal.

The apparatus of this invention has a specific application in the advantageous detection and amplification of electric signals; however, it is not intended to exclude other obvious applications of the mechanical-electrical transducer type. Operation of the present apparatus is based on a phase-sensitive switching device connected in circuit with an alternating-current power source and a direct-current responsive indicating device. An alternating-current, symmetrical-waveform power source normally drives the circuit and the switching device is cyclically operated in a predetermined, phase-displaced relationship which provides an output signal of symmetrical waveform. Thus, the output signal does not include a direct-current component to which the indicating device will respond and there will be no output signal. The switching device is responsive to an input signal means which is effective in modifying the phase relationship of the cyclic operation of the switching device to the alternating-current power source. The resultant effect of modifying the phase relationship of the cyclic operation of the switching device relative to the waveform of the power source is to produce a nonsymmetrical waveform having a direct-current component which is detectable by the indicating device. As the direct-current component is a function of the relative displacement introduced by the input signal, the indicating device provides a readout which is proportional to the input signal. The switching device is readily controllable by an input signal which is relatively small in comparison with the power source and this provides an advantageous amplification for improved resolution of output without necessitating the utilization of costly, highly-sensitive instrumentation.

The primary objective of this invention is to provide a phase-sensitive detector of the type described having a cyclically operated switching device which is responsive to an input signal to effect an opposite change in the conduction interval of adjacent half-cycles of the symmetrical-waveform, power-source current.

Another important objective of this invention is to provide a phase-sensitive detector apparatus of the type described having a gated-type, solid state switching device which may be triggered into a conducting state by a novel triggering circuit which effects an opposite change in the conduction interval of adjacent half-cycles of the power-source current in response to an input signal and thereby provides a nonsymmetrical waveform output signal having a direct-current component.

It is a further objective of this invention to provide a phase-sensitive detector apparatus of the type described having a direct-current-responsive indicating device connected in circuit with an alternating-current power source through a cyclically operable switching device forming a symmetrical-waveform output signal and triggering mechanism for normally cyclically operating the switching device to form a symmetrical-waveform output signal without a direct-current component and which a responsive to an input signal to effect an opposite change in the conduction interval of adjacent half-cycles of the power source current waveform and to thereby produce an output signal having a nonsymmetrical waveform and a direct current component.

It is also an object of this invention to provide a phase-sensitive detector apparatus to the type described having an output power circuit which has a direct-current output signal component that is controlled by a signal-sensing, phase-sensitive switching device to provide amplification and control of the signal.

These and other objects and advantages of this invention will be readily apparent from the following detailed description thereof and the accompanying drawings.

In the drawings:

FIGURE 3 is a graphic representation of the waveform of the several electrical quantities in the apparatus of FIGURE 1.

FIGURE 5 is a diagrammatic representation of a mechanical-electrical transducer and a schematic diagram of a phase-sensitive detector embodying the invention utilizing a light-activated, silicon-controlled rectifier.

FIGURE 6 is a schematic diagram of a phase-sensitive detector apparatus of modified form embodying the invention and which utilizes a five-layer, solid-state, controlled rectifier device.

FIGURE 7 is a graphic representation of the waveform of the several electrical quantities in the apparatus of FIGURE 6.

Figure 1:
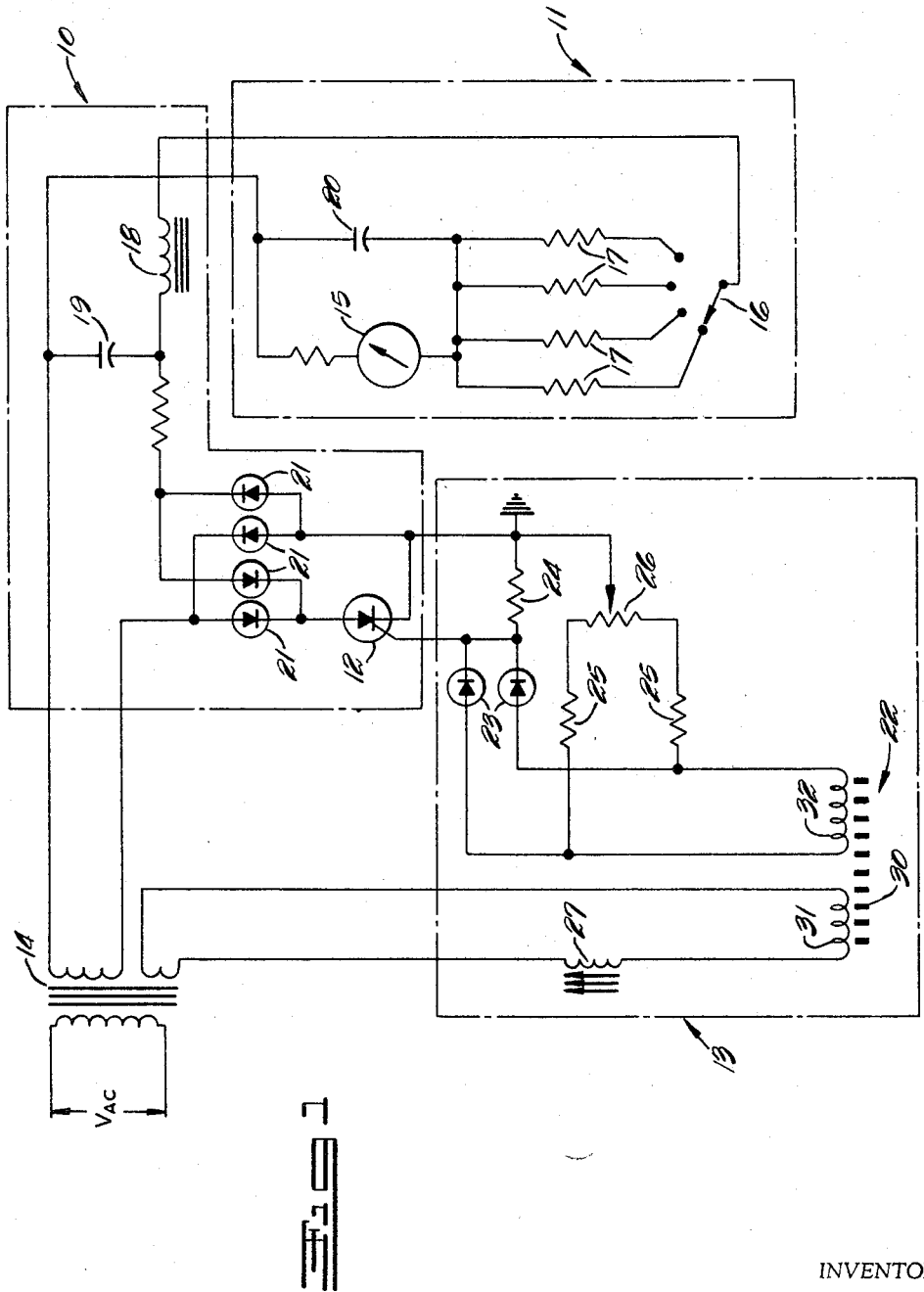
FIGURE 1 is a schematic diagram of a phase-sensitive detector apparatus embodying the invention which utilizes a silican-controlled rectifier.

Having reference to the drawings, particularly FIGURE 1, the invention is shown embodied in an electrical apparatus which is specifically adapted to the measurement of steady-state or direct-current magnetic fields. In the embodiment shown in the schematic diagram of FIGURE 1, the apparatus comprises a power circuit 10, an indicating circuit 11, a switching device 12, and an input signal and control circuit 13. The input signal and control circuit 13 in this embodiment includes a suitable magnetic field sensor which responsively injects a related signal into the switching device 12 to thereby control its operation. The switching device 12, in turn, is effective in controlling the waveform of the electrical output of the power circuit to provide an output having a direct-current component related to the magnetic field sensed by the magnetic field sensor. An indicating device interconnected with the indicating circuit 11 provides a suitable readout for the direct-current component.

The power circuit 10 includes a power input connection having a transformer 14 which is coupled to a suitable source of alternating current power having a symmetrical waveform. The transformer 14 is included in the circuit for isolation purposes and it may also be utilized to provide a desired voltage for the specific components utilized in the circuit.

Connected with the power circuit 10 is a direct-current responsive indicating circuit 11, which, as is shown, comprises an ammeter 15 for providing a visual readout. A center zero type meter movement is preferably utilized to facilitate the indication of currents of opposite polarity. Associated with the ammeter 15 is a range-selecting circuit which includes a manually-operable selector switch 16 and a number of resitsors 17 having selected values that may be connected in circuit with the ammeter to change the meter range. Also interconnected with the ammeter is an electronic filter network which is effective in substantially blocking the alternating-current components present in the power circuit and prevents their passage to the indicating circuit 11. This filter network is of a well known type and includes an inductor 18 and a capacitor 19. An additional capacitor 20 is connected in shunt relationship to the ammeter 15 to further reduce the effect of the alternating-current components that may be present.

Interposed in the power circuit 10 is the switching device 12 for cyclically completing the power circuit in predetermined phase relationship to the power source current waveform. In this embodiment of the invention, the switching device 12 comprises a silicon-controlled-rectifier series connected in a conductor of the power circuit. A silicon-controlled-rectifier is normally in a nonconducting state until triggered into a conducting state by a suitable control current which may be of pulse-form and would, therefore, normally prevent current flow in the power circuit. A silicon-controlled-rectifier remains in a conducting state, when once triggered during the time a voltage is applied to the power terminals, until the voltage thus applied to the power terminals becomes zero. Also, the switching device shown is of the unidirectional current conducting type and could only be effectively triggered into a conducting state for one-half of each cycle of an alternating-current waveform. The operation of the apparatus in accordance with this invention requires the maintenance of a normally symmetrical waveform in the power circuit 10 for a zero signal input. Therefore, the switching device 12 is connected into the power circuit 10 by means of a full-wave bridge rectifier and, consequently, the switching device is effective in controlling the current flow in the power circuit for each one-half cycle of the power circuit waveform. This full-wave bridge rectifier comprises four solid-state rectifier devices 21 connected in a typical bridge network and which rectify the power circuit current flow and voltage as to the switching device 12. Utilization of a switching devise which is bidirectional in operation is also contemplated and the use of such devices would accordingly eliminate the need for a full-wave bridge rectifier.

For operation of the apparatus in accordance with this invention, the switching device 12 is triggered to a conducting state during each half-cycle of the power source voltage waveform by a pulse-form signal voltage. Cyclic operation of the switching device 12 in this manner produces symmetrical voltage pulses in the power circuit 10 which have a resultant zero direct-current component when the switching device is triggered to a conducting state at the same point during each half-cycle. The most effective control over the power circuit waveform may be obtained when the triggering of the switching device to a conducting state occurs at the midpoint of each half-cycle or at a 90° phase displacement for the same cyclic frequency.

Thus, a control means comprising an input signal and control circuit 13 is provided for normally triggering the switching device 12 to a conducting state in the desired predetermined phase-displaced relationship for an assumed zero signal input. Power for operation of the control circuit may also be conveniently obtained through the transformer 14 supplying the power circuit as this also provides the necessary phase reference relative to the power circuit waveform. A secondary winding of the transformer 14, connected to the control circuit 13, may be of the type to provide a relatively reduced voltage if so desired as the control circuit is only required to provide a relatively small signal of pulse-form for effectively triggering the switching device 12 to a conducting state. Connected in the control circuit is an inductor 27 which effects the necessary 90° displacement of the trigger voltage pulses relative to the power circuit waveform.

The control circuit 13 also includes an input signal means which is effective in further controlling the triggering of the switching device 12 through phase displacement of the trigger voltage pulses. This embodiment of the invention is designed to detect and provide an indication of the presence of a magnetic field and the input signal means comprises a magnetic-field-sensing probe unit 22 connected in the control circuit 13. A magnetic field sensed by the probe unit 22 introduces a related signal to the control circuit that is superimposed on the normal control circuit signal and produces a phase displacement of the trigger circuit voltage pulses which are effective in triggering the switching device 12 to a conducting state. The details of construction and operation of the probe unit will be subsequently further described.

The control circuit signal is also of alternating-current waveform comprising a series of voltage pulses which must be rectified to trigger the switching device 12 for each one-half cycle of the power circuit waveform. This is advantageously accomplished by a rectifier circuit utilizing a pair of solidstate rectifier devices 23 connected to a load circuit in conjunction with a zero balancing network which are driven by the output of the probe unit 22. Both rectifier devices 23 have their cathode terminals connected to a common terminal which, in turn, is connected to the gate terminal of the silicon-controlled-rectifier switching device 12 and a load resistor 24. The load resistor 24 is connected across the gate and cathode terminals of the switching device to provide the necessary trigger pulse. The cathode of the switching device 12 and one terminal of the load resistor 24 may be connected to a common ground for stability of operation. A pair of current-blocking resistors 25 are connected together through a zero-balancing adjustable resistor 26 with the adjustable contact of this resistor being connected to the common ground terminal. The output of the probe unit 22 will thus be rectified as to the load resistance 24 and thereby trigger the switching device during each half-cycle.

Figure 2:
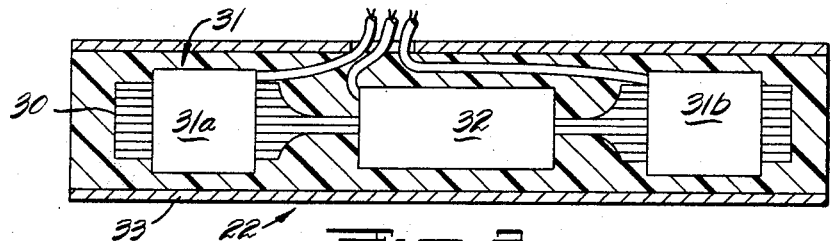
FIGURE 2 is a detailed, sectional view of the probe unit of the apparatus of FIGURE 1.

The probe unit 22 comprises an inductor having a magnetic core 30 and two current-conducting windings 31 and 32, as is best shown in FIGURE 2, which are encapsulated in a protective sleeve 33 with a suitable potting compound. The core 30 is preferably of laminated construction and is fabricated from a magnetic material having a relatively high permeability and is readily saturable. One of the current-conducting windings 31 forms a primary and is connected in circuit with a secondary winding of the power circuit transformer 14. This winding is preferably constructed in two coils, 31a and 31b, which are series connected in magnetically additive relationship. The two coils are mounted on opposite ends of the magnetic core 30 to provide a more advantageous linking of the magnetizing field with the core than would be obtainable with a single concentrated coil. The number of turns comprising the primary winding 31 of the probe unit is dependent on the current which flows in this section of the control circuit and must be adequate to provide a magnetomotive force sufficient to effect saturation of the core. Through appropriate selection of the material for the core, the core will be advantageously saturated in a relatively short period of time compared to a cycle of the magnetizing current.

The secondary winding 32 of the probe unit 22 comprises a substantially greater number of turns and is wound in a single coil which is mounted on the core between the two coils 31a and 31b of the primary winding. The terminals of the secondary winding 32 form the output terminal connection of the probe unit and are connected to the bridge rectifiers 23 of the control circuit 13 and provide a signal voltage to the output of the control circuit through the transformer action of the probe unit. The output signal voltage of the probe unit 22 will be of pulse form since the probe unit is designed to saturate relatively rapidly and a voltage will only be induced in the secondary winding 32 when there is a change in the magnetic flux in the inductor core 30. This pulse-form secondary voltage will have a symmetrical waveform and will have a phase displacement of 90° relative to the power circuit waveform, assuming that the probe unit 22 is not subjected to an environmental magnetic field. The voltage pulses cause current pulses to flow through the rectifier elements 23, load resistor 24 and effective portion of the zero-balancing network and thereby produce a trigger voltage of pulse form across the control circuit load resistor 24.

A signal represented by a steady-state magnetic field is introduced to the control circuit 13 through the probe unit 22. The magnetic flux of this field is operative on the magnetic core 30 of the probe unit and provides a related magnetic bias. As determined by the relative direction of the biasing magnetic flux in the core 30, the point during a cycle of the magnetizing current at which the core reaches saturation can be relatively phase-displaced in proportion to the magnitude of the biasing magnetomotive force. The effect of the biasing will be more fully described in the following detailed description of the operation of the apparatus.

Effectiveness of relatively weak magnetic fields in biasing the probe unit 22 may be greatly enchanced by forming the core 30 as shown in FIGURE 2. In this specific structure, the core 30 is constructed from a highly permeable material and the central portion may be formed with a substantially smaller cross-sectional area than either end portion. The magnetic flux linked with the core end portions will be concentrated in the smaller, cross-sectional central area with a correspondingly increased flux density. This smaller cross-sectional area increases the effectiveness of the magnetic field in biasing the magnetic core to saturation. Further improvement in the effectiveness of the probe unit is obtained through a laminated construction which reduces the eddy current losses of the magnetic circuit.

Operation of this embodiment of the invention can be best demonstrated with reference to FIGURE 3 which graphically illustrates the several voltage, current and magnetic waveforms in the circuit of FIGURE 1. These waveforms illustrate a condition where no external magnetic field is present to form an input signal and the conditions resulting when a magnetic field is present and provides either a relatively positive or negative magentic bias. Diagram A of FIGURE 3 shows the waveform of the power source voltage $E_s$ which is also the voltage in the primary circuit of the control circuit. This waveform is symmetrical and sinusoidal in both the primary of the control circuit 13 and in the power circuit 10 without relative phase displacement. There will be a difference in the relative magnitudes of the two voltages but this is not shown in the diagrams for simplicity of illustration. The waveforms shown in FIGURE 3 are not drawn to scale as to their magnitude but the relative phase relationships are related in the several diagrams. The current waveform in the primary of the control circuit 13 is relatively phase displaced, as shown in diagram B, because of the inductor 27 interposed in the circuit. The control circuit current $I_d$ flowing through the primary coils 31a and 31b of the probe unit 22 produces a magnetic flux which is substantially in phase with this current.

As a result of the magnetic flux thus linked with the magnetic core 30, the magnetic flux density $B_c$ in the central position of the core will have a waveform as shown in diagram C which illustrates the effect of saturation. A highly permeable material is preferably utilized in the construction of the core thereby minimizing the undesirable hysteresis effects. The rapid change in flux density induces voltage pulses in the secondary coil 32 and the secondary portion of the control circuit 13 will have a pulse-form output voltage $V_c$ with each pulse occurring at the time the magnetic flux density $B_c$ is changing in the magnetic core, as shown in diagram D. At all times that the core 30 is saturated, there will be no induced secondary voltage since the magnetic flux density remains constant in the core. The output voltage $V_c$ will comprise symmetrical pulses which will be uniformly time displaced. In comparing the phase relationship of the voltage pulses of diagram D with the power source voltage $E_s$ of diagram A, it will be noted that the pulses of the output voltage $V_p$ are relatively phase displaced by 90° to the power circuit voltage waveform.

The silicon controlled rectifier utilized as the switching device 12 in the embodiment of the invention illustrated in FIGURE 1 is of the type which can only be triggered to a conducting state by a positive voltage. Inclusion of the rectifier elements 23 in the output of the control circuit provides the necessary rectification of the voltage pulses in the secondary portion of the control circuit as is shown in diagram E of FIGURE 3. This diagram shows the rectified voltage pulses $V_r$ applied to the gating terminal of the silicon-controlled rectifier which results in a current flow for triggering the rectifier during each one-half cycle of the power circuit voltage. Proper adjustment of the zero-balancing network assures that the voltage pulses will be of equal magnitude for uniform triggering of the controlled rectifier.

Concurrently with the formation of the trigger voltage pulses, the power source voltage $E_s$ is applied to the power circuit 10. Although the silicon-controlled rectifier is a unidirectional conducting device, the full-wave bridge rectifier in the power circuit provides a unidirectional current flow for the controlled rectifier 12 while retaining the symmetrical, alternating-current voltage waveform in the power circuit. Consequently, the voltage $V_{scr}$ across the controlled rectifier will have a waveform as shown in diagram F which comprises a series of rectified pulses of one-quarter cycle duration. The voltage across the controlled rectifier is effectively reduced to zero during the times that the rectifier 12 becomes conducting and this "turn-on" point is determined by the phase displacement of the trigger pulse. At this point in the operational description of the apparatus, it has been assumed that the probe unit is not subjected to an external magnetic field and the triggering circuit has been adjusted to phase displace the trigger pulse 90° relative to the power circuit voltage waveform. Thus, the "turn-on" point of the controlled rectifier 12 will be at the 90 and 270 degree points of each cycle and a current $I_{scr}$ will flow through the controlled rectifier during the remainder of each half-cycle which comprise the 90–180 and 270–360 degree intervals of each cycle, as shown in diagram G.

Although the silicon-controlled rectifier current $I_{scr}$ is unidirectional, the resultant voltage waveform $V_p$ (see diagram H) in the remainder of the power circuit will be symmetrical comprising a series of alternating-current pulses. Since the output voltage $V_p$ has a symmetrical waveform, there will not be a direct-current component to which the indicating circuit 11 will respond and a zero output voltage $V_{D.C.}$ will be noted and this is graphically shown in diagram I. The output is purely of alternating-current form to which the indicating circuit 11 is not responsive.

However, subjecting the probe unit to an external magnetic field will effect a relative phase displacement of the trigger pulses $V_c$ and which will result in destruction of the symmetry of the power circuit voltage waveform $V_p$. The effect of two distinct magnetic fields on the device is also shown in FIGURE 3 by the resultant changes in the waveforms. The external magnetic fields are separately considered and are of the same magnitude although of opposite polarity.

A relatively positive magnetic bias $H_1$ is applied in the first instance under consideration and is represented in diagram B of FIGURE 3 by the broken line displaced above the time axis. The effect of the application of this positive magnetic bias $H_1$ on the remaining portions of the apparatus is also shown by the broken line in diagrams C through I of FIGURE 3. Although diagram B illustrates the magnetizing current waveform, the magnetic force produced by this current will have a similar waveform and will have a phase displacement of 90° of a magnetic bias $H_1$, which is related to an external magnetic field under consideration and is the input signal, affects the magnetic flux density in the probe unit magnetic core 30 by changing the time at which the core becomes saturated during the change of the control circuit magnetizing current $I_d$ from one polarity to the other. This results in a change in the time during a half-cycle of the power supply voltage $E_s$ at which the silicon-controlled rectifier 12 is triggered to a conducting state. Referring to diagrams F and G, it will be seen that the controlled rectifier 12 will be conducting for a relatively shorter interval during the first half-cycle shown while there will be a relatively longer interval of conduction during the following half-cycle.

In the power circuit 10, this relative, opposite change in the conduction interval of adjacent half-cycles produces a nonsymmetrical-waveform voltage $V_p$ as shown in diagram H. The nonsymmetrical-waveform has a direct-current component $V_{D.C.}$ which has a negative value in this instance, and is accordingly detected by the indicating circuit 11. Through appropriate calibration of the apparatus, the direct-current component may be quantitatively related to the input signal.

Similarly, the addition of a negative magnetic bias $H_2$ will affect the operation of the silicon-controlled rectifier 12 to produce a nonsymmetrical waveform in the power circuit 10. The direct-current component $V_{D.C.}$ in this instance will be of opposite polarity and the indicating circuit 11 will provide a corresponding indication.

The apparatus embodying this invention and as shown in FIGURE 1 advantageously detects an environmental magnetic field and provides a visual readout. Through the phase-sensitive detection system of this invention, an accurate determination of the magnetic field is readily obtained as the apparatus has a relatively high degree of resolution. A small change in the magnetic bias effects a relatively large change in the phase displacement of the triggering voltage pulses of the control circuit 13. This phase displacement is detected by the switching device 12, which device advantageously comprises a silicon-controlled rectifier, and further enhances the operation through an effective amplification of the input signal. A small signal in the control circuit 13 is capable of effectively controlling a large quantity of power in the power circuit 10 by means of the switching device. This resolution and amplification is an important advantage of the present apparatus over the prior art apparatus which requires complex circuitry to accomplish the detection and amplification.

Figure 4:
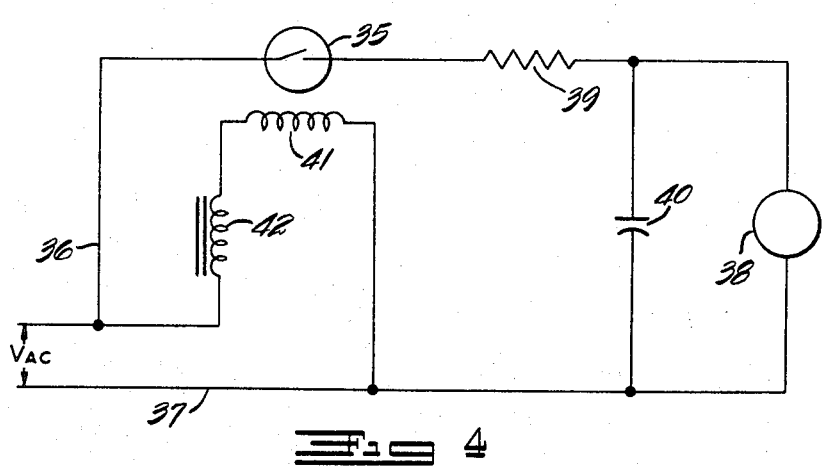
FIGURE 4 is a schematic diagram of a phase-sensitive detector apparatus of modified form embodying the invention which utilizes a reed switch.

A phase-sensitive detector apparatus which also embodies the invention is shown in FIGURE 4. This modification of the invention is designed to be responsive to magnetic fields but utilizes a reed switch as the switching device 35. The reed switch 35 is connected in a power circuit which comprises a pair of conductors 36 and 37 connected to a suitable alternating-current power source and to an appropriate load 38. As in the previous embodiment, the power source preferably has a sinusoidal waveform which is symmetrical and may be the readily available 117 $V_{A.C.}$, 60 cycle power. The load 38 is related to the indicating circuit and is responsive to a direct-current voltage. As an example, the load 38 may comprise a relay or solenoid of the type which requires a certain magnitude direct-current voltage for the operation thereof and will, therefore, provide a response to the output of the power circuit. An electronic filter is also connected between the power circuit and the load 38 to bypass the alternating-current components present in the power circuit. This filter is shown in simplified form as comprising a resistor 39 and a capacitor 40 with the capacitor connected in shunt relationship with the load 38.

The input signal and control circuit for controlling the operation of the reed switch 35 comprises an electromagnet 41 and a phase-shifting inductor 42. The inductor 42 and electromagnet 41 are series connected across the power circuit which provides the necessary phase relationship for operation of the control circuit. As in the previously described embodiment, the inductor 42 introduces a 90° phase displacement in the operation of the control circuit for optimum operation of the apparatus. The electromagnet 41 is disposed closely adjacent the reed switch 35 to cause cyclic operation of the switch and thereby provide a power circuit voltage which is of symmetrical waveform similar to that shown in diagram H of FIGURE 3 for the case where an external magnetic field is not present. Thus, there will not be a direct-current component in the output voltage and the load 38 will not be responsive.

Application of an external magnetic field to the reed switch 35 will provide a biasing force which will effect a phase displacement of the time of operation of the switch. The effect of the magnetic bias on the switch 35 is to produce a nonsymmetrical output voltage in the power circuit having a direct-current component to which the load 38 will respond. As the magnetic bias becomes relatively positive or negative, and direct-current component in the power circuit will become negative or positive which results in a phase-sensitive detection of an input signal in a manner similar to that previously described.

In FIGURE 5, a mechanical-electrical transducer apparatus embodying the invention is shown to illustrate a further application of the invention. The principle of operation as to phase-sensitive detection in this modification is the same as that described in detail with respect to FIGURE 1. As in the circuit of FIGURE 1, the apparatus of FIGURE 5 comprises a power circuit 45, an indicating circuit 46, a switching device 47 and an input signal and control means 48. The power circuit 45 is supplied with a suitable alternating-current, sinusoidal waveform voltage through a transformer 49 and is connected to the indicating circuit 46, which may comprise a simple electrical load, through an electronic filtering network. The filtering network includes a capacitor 50 and an inductor 51 which effectively bypass the alternating components in the power circuit and block their passage to the indicating circuit 46.

Connected in the power circuit 45 is the switching device 47 which comprises a light-activated-silicon-controlled-rectifier identified hereinafter in the specification as "LASCR" and in the drawings as "Light Activated SCR". The LASCR is also a unidirectional current-conducting device but is triggered to a conducting state by the incidence of light thereon. Since the LASCR is unidirection in conduction, a full-wave bridge rectifier consisting of four solid state rectifier elements 52 is utilized to connect the LASCR into the power circuit 45. Thus, the switching device will be capable of effecting control over each half-cycle of the power source voltage.

In this embodiment, the input signal and control means 48 is designed to be mechanically responsive and specifically illustrated as being responsive to air pressure. The control means 48 comprises a source of illumination, such as an ordinary electric lamp 53, for triggering the LASCR switching device 47 and a mechanism to control the incidence of the light of the LASCR. Control of the incident light is effected by an opaque plate 54 provided with a small aperture 55 interposed between the lamp 53 and the LASCR 47. The plate 54 is relatively positioned to permit an incident light beam to pass to the LASCR through the aperture when in a center or neutral position and thereby effect the triggering action.

Means for mechanically oscillating the plate 54 and displacing it from the center position is provided to effect the desired cyclic operation of the LASCR. This means comprises an air chamber 56 having a flexible diaphragm 56a to which the plate 54 is rigidly fixed. Cyclic pulsation of the diaphragm 56a produces an oscillation of the plate 54. Such a cyclic pulsation may be accomplished through cyclic pulsing of a second diaphragm 56b of the chamber 56 by an electric solenoid 57 operating on an armature 58 which is attached to the diaphragm 56b. A biasing spring 58a is interposed between the armature 58 and solenoid 57 to provide the displacing force in a direction opposite to that of the solenoid. The solenoid 57 is operated in synchronization with the power circuit 45 but with a relative phase displacement of 90° as a result of the interposed phase displacing inductor 57a. Triggering of the LASCR 47 is thus accomplished at the 90 and 270 degree points of each cycle of the power source voltage for optimum operation of the apparatus.

Operation of the apparatus without an input signal will only produce a symmetrical waveform in the power circuit 45 and the indicating means 46 will not be responsive. Application of a biasing pressure to the air chamber 56, as by atmospheric air pressure when the chamber is closed, will affect the oscillation of the plate 54 and change the time in each half-cycle of the power source voltage at which the LASCR 47 will be triggered to a conducting state. With this resultant change in the triggering of the LASCR, the power circuit output voltage will have a nonsymmetrical waveform with a direct-current component to which the indicating circuit 46 is responsive. The operation of this modification of the invention is substantially identical with the operation of the apparatus shown in FIGURE 1 and may be graphically represented as shown in FIGURE 3.

Another example of the utilization of the pressure transducing aspect of the apparatus of FIGURE 5 would be the introduction of a fluid biasing pressure to the interior of the air chamber 56. This may be accomplished by a fluid connection conduit 59 between the pressure source and the chamber. This conduit 59 is shown as having an interposed valve which would be opened for operation of the apparatus in this manner and closed for external atmospheric pressure reponsive operation.

The apparatus of FIGURE 5 may also be operated in response to a magnetic signal with minor modification. To avoid the effects of atmospheric pressure, the air chamber 56 may be omitted as a unit while retaining the diaphragm 56a. In this instance, the armature 58 would be attached to the diaphragm 56a and the solenoid would directly oscillate the diaphragm. A magnetic signal applied to the armature 58 will result in biasing the apertured plate 54 in one direction and thereby effect a displacement of the point at which the LASCR is triggered to a conducting state. The magnetic signal may be the environmental earth's magnetic field or the signal may be applied by an electromagnetic coil.

In the previous examples of operation, the biasing signal was applied to the apertured plate 54 which was oscillated at a predetermined frequency. This is not to be considered as a limitation on the utilization of the apparatus as a relative displacement of the LASCR 47 or lamp 53 in response to a biasing signal will also produce a related output. A biasing signal effecting a relative displacement of either element results in a displacement transducer which may be utilized for linear or angular measurements.

A phase-sensitive detector apparatus embodying this invention and utilizing a voltage breakdown device as the switching device is illustrated in FIGURE 6. The switching device 60 comprises a five-layer silicon switch which may be triggered to a conducting stage by the application of a predetermined voltage and will conduct in either direction. As in the reed switch apparatus of FIGURE 4, the bi-directional conduction characteristic eliminates the need for rectification devices and results in a simple apparatus with relatively few components. The operation of the apparatus of FIGURE 6 is similar to that of the apparatus of FIGURE 1 and may be readily related thereto. This modification of the invention also includes a power circuit, an indicating circuit, a switching device, and an input signal and control circuit.

The power circuit consists of a pair of conductors 61 and 62 which are connected to a suitable power source having a sinusoidal, alternating-current voltage. Interposed in the power circuit is one winding of a three-winding inductor 63 which is constructed with a highly permeable, readily saturable core and which is preferably of toroid shape. With this construction, it is possible to obtain relatively rapid saturation of the core for a specific magnetizing current with a resultant steep sloped magnetic flux density waveform producing a sharply defined switching point. This winding of the inductor 63 is identified in FIGURE 6 by the numeral 64 and is series connected with the switching device 60. Also series connected with the switching device 60 is the indicating circuit which comprises, in its most simple form, a direct-current responsive electrical meter 65 and a current-limiting resistor 66. A filter capacitor 67 is connected in shunt relationship to the meter 65 and resistor 66 to bypass the alternating-current components. The switching device 60 is selected to have a breakdown voltage that is greater than the applied peak value power source voltage and will not be triggered to a conducting state without an increase of the voltage.

The voltage applied to the switching device 60 is sufficiently increased for triggering by the control circuit which comprises a second winding 68 of the inductor 63. The second winding 68 is also connected to the power circuit conductors 61 and 62 for synchronous operation therewith although an inductor 69 is interposed in the control circuit to effect a 90° phase displacement of the control circuit current. Through appropriate design of the control circuit, an additional voltage will be induced in the power circuit through the magnetic coupling of the inductor 63 which will be sufficient to trigger the switching device 60 to a conducting state.

This triggering operation may be readily understood by reference to FIGURE 7 which illustrates the waveforms of the voltages, currents and magnetization in the apparatus. Diagram A of FIGURE 7 represents the sinusoidal, symmetrical-waveform voltage $E_s$ of the power sources. In diagram B, the control circuit current $I_d$ is shown in 90° phase displaced relationship to the power source voltage and is also representative of the magnetomotive force in the inductor 63. The magnetic flux density in the inductor 63 is shown in diagram C illustrating the saturation of the inductor. As in the case of the circuit of FIGURE 1, the change in magnetization and core saturation operate to induce voltage pulses in the first winding 64 of the inductor as indicated in diagram D. The induced voltage pulses of diagram D are superimposed on the power source voltage with the resultant waveform being as shown in diagram E. The voltage required for triggering of the switching device 60 is also represented in diagram E by the broken lines and, by design, will be less than the peak value of the composite applied voltage. During each half-cycle of the power source voltage, the switching device 60 will be triggered to a conducting state and the power circuit will have a current of symmetrical waveform as shown in diagram F that does not contain a direct-current component to which the meter 65 will respond.

An input signal may be introduced to the apparatus by means of the third winding 70 of the inductor 63. An inductive impedance 71 is connected in series with this winding to prevent an effective short circuiting of the windings when an input signal voltage is applied. A direct-current signal applied to the input terminals of this winding will produce a magnetic biasing force in the inductor core and may be relatively positive or negative as indicated by the broken lines $H_1$ and $H_2$ in diagram B. The effect of the magnetic bias is to change the phase displacement of the trigger pulse as in the case of the circuit of FIGURE 1. This change in phase displacement of the trigger pulse is shown in diagram D for each instance. The result of the relative phase displacement of the trigger pulse is to change the power circuit current to a non-symmetrical waveform (see diagram F) with a consequent direct-current component voltage (see diagram G). The meter 65 will respond to the direct-current voltage and provide a related output.

A specific advantage of the circuit of FIGURE 6 is its inherent low cost construction as compared with conventional magnetic-amplifier circuits of the prior art. The inductor 63 does not transfer any power by means of induction, other than the power necessary to trigger the switching device 60, as only the winding 64 carries the load current and the core need only be designed to handle the magnetic flux signal. This results in a substantial reduction in the cross-sectional area of the core that is required in comparison with conventional magnetic-amplifier cores with a resultant cost reduction.

The apparatus of this invention has a further advantage in that it has a substantially constant amplification over its designed operating range of power circuit voltages. Although an increase in the power circuit or line voltage will also increase the amplitude of the sinusoidal switching signal of the control circuit with a consequent decrease of the input signal sensitivity since the input signal will remain constant, the amplification will remain constant. Any decrease in the signal sensing sensitivity of the control circuit will be offset by the increase in voltage of the power circuit.

Hereinbefore the apparatus has been described in its operation with the frequency of the control circuit being the same as that of the power circuit. With respect to the apparatus shown in FIGURE 5, it will be readily apparent that the apertured plate 54 will be oscillated at twice the frequency since the magnetic action of the solenoid will occur during each half-cycle and will not be dependent on the polarity. This effect may be eliminated through use of a polarized coil in the case of pressure or distance sensing. Although a second triggering signal will be produced during each half-cycle of the power circuit voltage, the second signal is ineffective in controlling the output of the apparatus since the LASCR 47 will continue to conduct during the half-cycle after it was initially caused to conduct. An advantage of the double frequency mode of operation in magnetic sensing is that external effects having the primary frequency are eliminated. This advantageous operation is also applicable to the reed switch type apparatus of FIGURE 4 and may be applied to other forms of the apparatus through appropriate circuitry.

Figure 8:
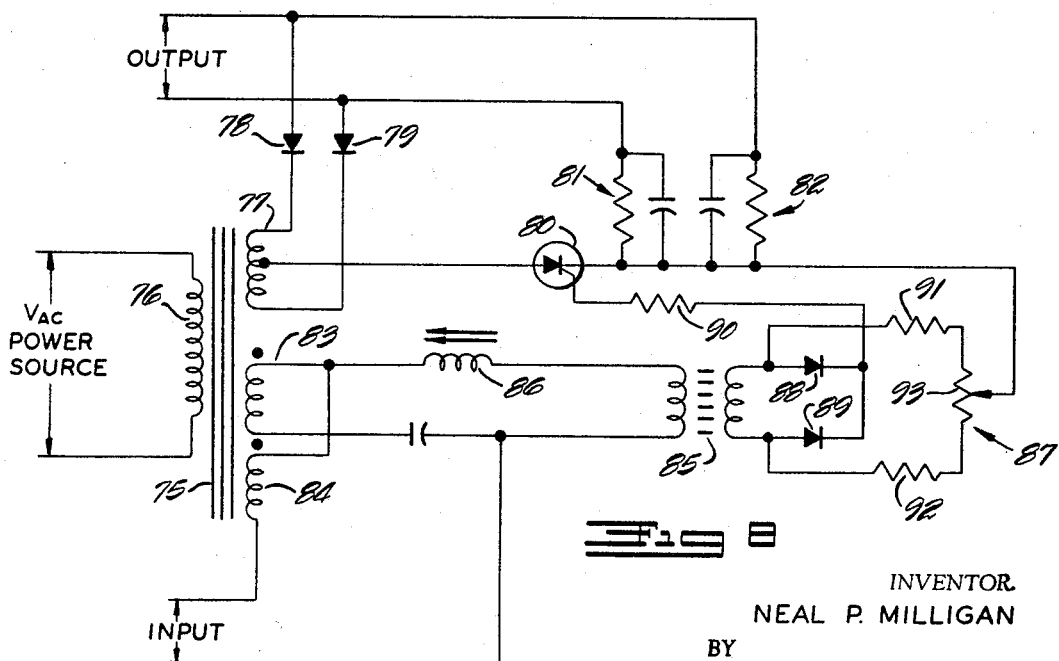
FIGURE 8 is a schematic diagram of a further modified circuit for a phase-sensitive detector apparatus embodying the invention.

The circuit shown in FIGURE 8 incorporates modifications in both the control circuit and the power circuit although the principle of operation remains the same as has been fully described. The inductive coil windings of the power circuit and control circuit are all wound on the same core which is designated as 75. The primary winding 76 of this inductor is connected to a suitable power source and a center-tapped secondary winding 77 provides the output power of the apparatus. Each end of the winding 77 is connected to a conductor of the output circuit through a respective diode, 78 and 79, while the center-tap is connected to the output conductors through a silicon controlled rectifier 80 and the resistance-capacitance filter sections 81 and 82. The effect of this power circuit is to provide full wave rectification for operation of the single switching device 80 having a unilateral current conducting characteristic with only two diodes.

Control of the switching device 80 is effected through a control circuit having a control signal winding 83 and an input signal winding 84 wound on the core 75. The control signal winding 83 is connected to the primary winding of a saturable reactor 85 through a phase shifting inductor 86 which may be of the adjustable type. The secondary of the saturable reactor 85 is connected to the gating terminal of the switching device 80 through a rectifier and zero balancing network, designated generally at 87. This latter network includes a pair of diodes 88, 89, current limiting resistor 90, blocking resistors 91, 92 and a zeroing potentiometer 93 which function substantially as described in conjunction with the circuit of FIGURE 1.

The control signal winding 83 and the input signal winding 84 are wound on the core 75 in additive relationship and the input signal winding also functions as an input impedance to prevent shorting of the other winding when a direct current input signal is applied. The input circuit is completed through the inductor 86 and primary of the reactor 85 with a capacitor interposed in the control circuit to prevent the D.C. input signal from flowing through the control signal winding 83.

This circuit of FIGURE 8 operates as described hereinbefore. The control signal functions to switch the switching device 80 to provide a symmetrical output voltage waveform. The input signal provides a biasing effect which results in producing a nonsymmetrical output voltage waveform which is indicative of the input signal.

As will be readily apparent from the foregoing detailed description of the invention in the several embodiments, that the phase-sensitive detector apparatus of this invention provides a novel means for detecting an input signal and providing a related readout. The apparatus is capable of very high resolution through the phase-displacement technique. Amplification of current, voltage or power is also readily obtained as a result of the utilization of circuitry having power switching devices which effect the necessary phase displacement. Input voltage regulation is obtained with constant amplification over the designed range of operation. The apparatus embodying this invention may be advantageously constructed utilizing simple components of rugged, economical design.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A phase-sensitive detector apparatus comprising
   (A) an electric circuit connected to receive power from an alternating-current electrical power source of symmetrical, sinusoidal waveform and specific frequency, said electric circuit including
      (1) an output connection and
      (2) normally nonconductive switch means connected therein for controlling current flow in said electric circuit to said output connection, said switch means being switchable to a conductive state during each half-cycle of the power source voltage in response to a control signal applied to said switch means and returning to a nonconductive state at the termination of each half-cycle;
   (B) control means for forming and applying said control signal to said switch means, said control means connected to said power source and including
      (1) input signal means responsive to an input condition and forming an input signal having either a positive or a negative characteristic, and
      (2) control-signal-forming means normally forming said control signal at a same predetermined time during each half-cycle of said power source voltage resulting in said switch means being conductive for equal time intervals during each half-cycle to produce a symmetrical-waveform current flow in said electric circuit, said control-signal-forming means responsive to said input signal and being biased thereby to effect phase-displacement of the time of application of said control signal during each half-cycle with the phase-displacement in adjacent half-cycles being of opposite sign as determined by the characteristics of said input signal and to switch said switch means to a conductive state at relatively phase-displaced times resulting in unequal conduction time-intervals during such adjacent half-cycles and a non-symmetrical-waveform current flow in the electric circuit which current flow includes a direct current component related to the input signal, and (C) current detector means connected with said electric circuit at said output connection and being responsive only to the direct current component whereby said current detector means senses a phase-displacement produced by said input signal means.

2. A phase-sensitive detector apparatus according to claim 1 wherein said switch means includes a controlled rectifier operative to control current flow during each half-cycle of the power source voltage and responsive to said control signal during each such half-cycle.

3. A phase-sensitive detector apparatus according to claim 2 wherein said controlled rectifier is of the unidirectional current conducting type and said electric circuit includes a full-wave rectifier circuit connected with said controlled rectifier to permit said controlled rectifier to control current flow during each half-cycle of the power source voltage.

4. A phase-sensitive detector apparatus according to claim 2 wherein said controlled rectifier is of the gated type responsive to said control signal and is provided with a gating terminal for receiving said control signal, and said control-signal-forming means includes an output terminal connected with said gating terminal.

5. A phase-sensitive detector apparatus according to claim 4 wherein said control-signal-forming means includes an inductor having a saturable core, an output winding magnetically coupled with said core and connected in circuit with said output terminal to said gating terminal, and an input winding magnetically coupled with said core and connected to receive electrical power from the electrical power source and normally producing a saturating magnetic field in said core at a predetermined time during each half-cycle resulting in formation of a voltage-pulse control signal in said output winding, said input signal comprising a magnetic field coupled with said saturable core and forming a biasing magnetic field in said core.

6. A phase-sensitive detector apparatus according to claim 5 wherein said control-signal-forming means includes means for normally effecting 90° phase-displacement of the time of saturation of said saturable core relative to the power source voltage.

7. A phase-sensitive detector apparatus according to claim 2 wherein said controlled-rectifier is of the light-actuated type and said control-signal-forming means includes an illumination source and means for controlling the incidence of light from said illumination source on said controlled-rectifier.

8. A phase-sensitive detector apparatus according to claim 7 wherein said means for controlling the incidence of light includes an opaque plate formed with a light-transmitting aperture supported in interposed relationship between said illumination source and said controlled-rectifier, and oscillating means coupled with said plate for oscillating said plate synchronously with the power source to normally permit transmission of light to said controlled-rectifier at a predetermined time during each half-cycle of the power source voltage, said input signal comprising a mechanical force coupled with said oscillating means and providing a biasing displacement.

9. A phase-sensitive detector apparatus according to claim 1 wherein said switch means comprises a voltage breakdown device which becomes conductive when subjected to a voltage of predetermined magnitude, and said control-signal-forming means forms a control signal having a voltage magnitude at least equal to said breakdown voltage.

10. A phase-sensitive detector apparatus according to claim 9 wherein said control-signal-forming means includes a saturable inductor comprising a saturable core, a first winding magnetically coupled with said core and connected in series with said voltage breakdown device, and a second winding magnetically coupled with said core and connected to receive electrical power from the power source for producing a magnetic field which causes said core to normally saturate during each half-cycle, and said input signal means includes an input winding magnetically coupled with said core for inducing in said core a biasing magnetic field.

References Cited

UNITED STATES PATENTS

| | | | |
|---|---|---|---|
| 2,933,673 | 4/1960 | Jones et al. | 323—89 |
| 2,987,666 | 6/1961 | Manteuffel | 321—25 XR |
| 3,204,172 | 8/1965 | Darling et al. | 323—22 X |
| 3,210,605 | 10/1965 | Jones. | |
| 3,210,661 | 10/1965 | Shatto | 324—83 |
| 3,267,368 | 8/1966 | Rock et al. | 324—83 XR |

RUDOLPH V. ROLINEC, *Primary Examiner.*

P. F. WILLE, *Assistant Examiner.*

UNITED STATES PATENT OFFICE
CERTIFICATE OF CORRECTION

Patent No. 3,399,346                              August 27, 1968

Neal P. Milligan

It is certified that error appears in the above identified patent and that said Letters Patent are hereby corrected as shown below:

Column 2, line 3, "a", second occurrence, should read -- is --. Column 3, line 5, "resitsors" should read -- resistors --; line 46, "devise" should read -- device --. Column 7, line 8, "and will have a phase displacement of 90°" should read -- and may be graphically related. The addition --; line 51, "smal" should read -- small --.

Signed and sealed this 13th day of January 1970.

(SEAL)
Attest:

Edward M. Fletcher, Jr.                         WILLIAM E. SCHUYLER, JR.
Attesting Officer                                       Commissioner of Patents